UNITED STATES PATENT OFFICE.

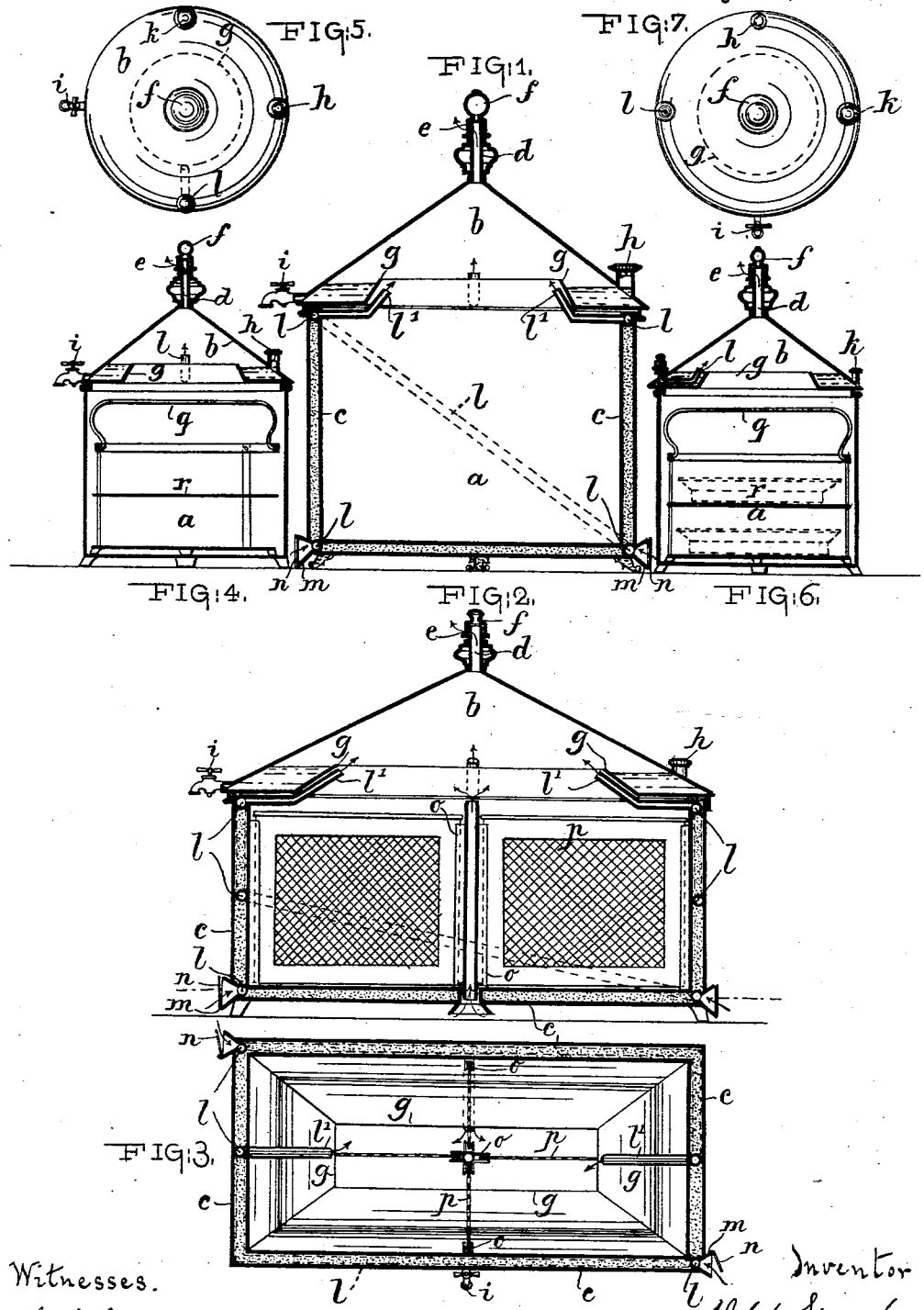

ADOLPH ERNECKE, OF BERLIN, GERMANY.

APPARATUS FOR PRESERVING FOOD.

SPECIFICATION forming part of Letters Patent No. 564,601, dated July 28, 1896.

Application filed October 16, 1895. Serial No. 565,852. (No model.)

*To all whom it may concern:*

Be it known that I, ADOLPH ERNECKE, a subject of the Emperor of Germany, residing at Berlin, in the German Empire, have invented certain new and useful Improvements in Apparatus for Preserving Food, of which the following is a specification.

The present invention relates to receptacles for storing victuals and eatables of all kinds, which are so constructed that these perishable contents remain fresh for a longer period of time, being preserved against decomposition and fermentation. This receptacle forms a cheap substitute for the ice-chests generally used in households, which, on account of the high price, are very rare in the households of the poorer classes, especially as they still require the daily expense for the ice. The new receptacle, however, is accessible to all and the cooling liquid employed therein costs only a few cents per month.

The new apparatus is shown in the accompanying drawings in different practical forms.

Figure 1 shows the receptacle in vertical section having only one inner space of storage and being preferably of cylindrical form. Figs. 2 and 3 show in vertical and horizontal sections an apparatus of oblong form, the inner space of storage of which may be divided into two or more chambers. Figs. 4 and 5, also 6 and 7, represent in vertical section and plan view, respectively, an apparatus of smaller and simpler form with removable shelves.

The apparatus, Fig. 1, consists of a receptacle of cylindrical or other form resting on legs and being closed by a cover $b$ of particular construction and being removable. The sides and bottom $c$ are made of double walls filled with a bad conductor of heat. The cover $b$ has a conical form carrying at the apex a small escapement-tube with lateral openings $e$ for the escape of gases. The latter can be closed and regulated in size by a revolving knob $f$. The lower edge of the cover $b$ is provided at its inside with an annular trough $g$, having the object to receive a conserving liquid, being a suitable solution of any of the cheap conserving salts. For filling in and withdrawing this liquid openings are provided, one to be closed by a screw-plug $h$ and the other to receive a faucet or spigot $i$. Besides, a glass tube $k$ may be applied to show the level of the liquid. (See Figs. 6 and 7.)

For the admission of fresh air the ventilating-pipes $l$ are arranged, two or more in number. The same enter at the lower edge of the receptacle $a$ and rise in a curve within the double walls of the sides $c$, finally ending at $l'$, near the inner edge of the trough $g$. The entrance of the outer air is effected through the funnel-shaped mouthpiece $m$, provided with a throttle $n$ for regulation.

The preserving action of the apparatus results from the slow evaporation of the preserving liquid in the trough $g$. The vapors fill gradually the whole inner space of the receptacle $a$, commingle with the air contained therein as well as with the vapors emanating from the eatables, and thus by their chemical properties prevent the injurious action of the air upon the provisions to be conserved. At the same time a constant renewal of the air mixed with the vapors is effected, for the air passing through the pipes $l$ produces a slow but constant escapement of the mixture through the upper outlet-openings $e$, so that the conserving vapors of the liquid in the trough $g$ are never fully saturated with the vapors coming from the rest of food. Numerous and careful trials by me have shown that provisions like bread, meat, vegetables, butter, &c., remain good for two weeks, while fresh meat can be conserved for eight days in the receptacles described.

The apparatus, Figs. 2 and 3, differs from the one above described by its shape, which is square or oblong, having consequently a cover of pyramidical form. The same is, besides, provided in the middle and on the sides by guide-rails $o$, into which partitions $p$ can be placed. Thus the provisions can be stored separate from each other in one and the same receptacle. When larger pieces of fowl, venison, &c., should be stored, one or the other of the partitions may be withdrawn, according to the size of the piece to be stored. The guides $o$ in the middle are preferably secured upon a hollow pillar or tube, so that air can be admitted from below through the same. This pillar or tube is made removable, being simply inserted into the opening in the bottom.

The apparatus shown in Figs. 4 to 7 are of a more simple construction and have the object to receive small rests of food such as soup, fruit, pastry, &c. They are made of single walls only, without insulating filling. The air-pipes $l$, are here provided within the trough $g$, Fig. 6. Frames $r$, provided with handles $q$, can be inserted to render the storage and removal of provisions more easy.

Having thus described my invention, I claim—

The combination in apparatus for preserving, of an open-top double-walled vessel, having ventilating-pipes between the walls thereof, said pipes provided with inwardly-projecting upper ends, and outwardly-projecting lower ends, as described, with a conical cover having, within its base, an open-top annular trough, said trough provided with a capped inlet-pipe, a gage, and a faucet, and the apex of the cover provided with an air-escape pipe and regulator, substantially as set forth.

In testimony whereof I have signed my name to this specification in the presence of two subscribing witnesses.

ADOLPH ERNECKE.

Witnesses:
J. W. HAUPT.
CHAS. DE KAY.